June 25, 1968  D. V. BERCHTOLD  3,389,824
PICNIC CHEST CONSTRUCTION
Filed Dec. 7, 1966
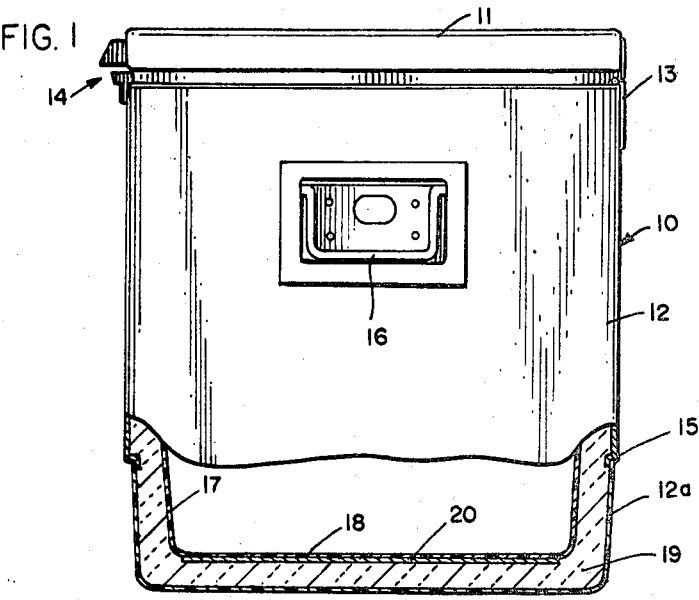
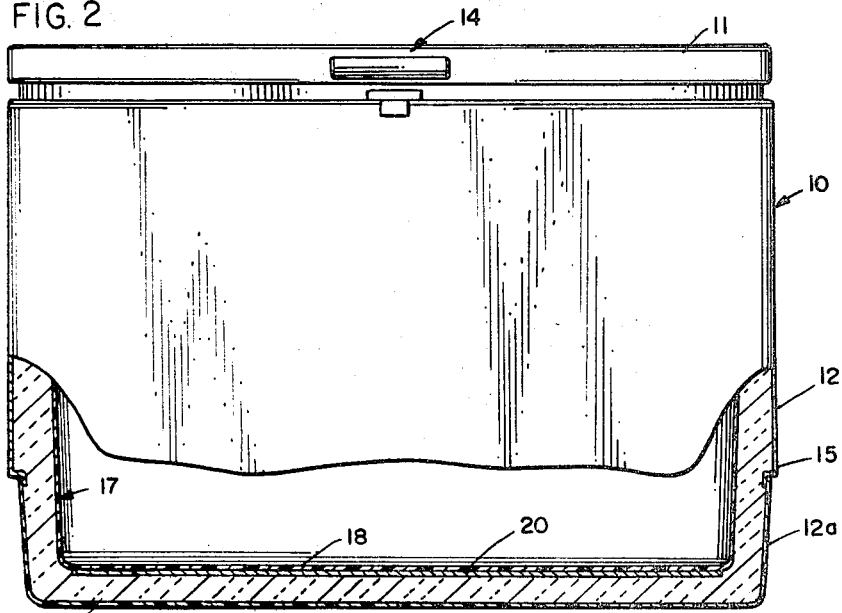
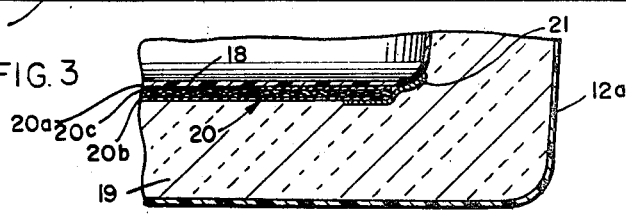
INVENTOR:
DONALD V. BERCHTOLD
BY
Dawson, Tilton, Fallon, Lungmus & Alexander
ATT'YS

United States Patent Office 3,389,824
Patented June 25, 1968

3,389,824
PICNIC CHEST CONSTRUCTION
Donald V. Berchtold, Wichita, Kans., assignor to The Coleman Company, Inc., Wichita, Kans., a corporation of Kansas
Filed Dec. 7, 1966, Ser. No. 599,766
7 Claims. (Cl. 220—9)

ABSTRACT OF THE DISCLOSURE

In accordance with the present invention, the construction of picnic coolers having styrene liners surrounded by polyurethane foam insulation is improved by interposing a sheet of flexible fiberboard between the bottom of the liner and the polyurethane foam. The fiberboard sheet has its upper surface in contact with the underside of the liner bottom and its lower surface in contact with the polyurethane foam. Preferably, the fiberboard sheet is corrugated fiberboard. The plastic liner is preferably formed from a polymer of styrene butadiene, and acrylonitrile, and the invention is particularly useful where the polyurethane foam was prepared in place using a chlorofluoroalkane foaming agent.

Summary of the invention

Chest-type picnic coolers commonly employ deep drawn plastic liners. Since the liners are formed from sheet material which is drawn to the shape of the inside of the chest, the thinnest wall portions of the liner are at its bottom. The bottom portion of the liner is therefore particularly vulnerable to denting, puncturing, and similar impact damage. It will be understood that metal or glass objects having sharp edges or corners are transported in the coolers in contact with the liner. Moreover, blocks of ice are commonly used to provide cooling. The plastic liner is therefore subjected to heavy abuse which can easily cause denting or puncturing. These problems have been alleviated to some extent by employing foamed-in-place plastic insulating material which surrounds the liner, providing a resilient, shock-absorbing type of support. This procedure has been particularly successful with polystyrene bead foam. The practice has been much less successful with polyurthane foam, although polyurethane foam has insulating advantages over polystyrene foam. In connection with the present invention, it has been found that polyurethane foam does not provide adequate support for the bottom of the liner. The friability of the urethane foam allows it to be compressed along shear lines of the sharp edges of the unit compressing it, such as the corners of a cake of ice, and there is thereby a tendency to establish localized stresses in the sheet material of the liner. The result is that the resistance to puncturing of the liner bottom is substantially reduced.

The above problem is aggravated when the liner is formed of a styrene plastic such as polystyrene or a styrene co-polymer. Apparently the urethane foam either chemically or mechanically tends to degrade the resistance of the styrene plastic, and this also tends to reduce the resistance of the liner to puncturing. One of the most convenient foaming agents for polyurethane is a chlorofluoroalkane foaming agent. Unfortunately, it appears that this type of foaming agent tends to chemically attack styrene plastic liners, which can cause further weakening of the liner bottom.

The present invention therefore provides an improved construction for a picnic cooler chest which substantially overcomes the problems and difficulties discussed above. More specifically, it provides in a picnic cooler chest a styrene plastic liner and polyurethane foam combination where the bottom of the liner is of adequate strength and has sufficient resistance to puncturing. The invention permits the use of a chlorofluoroalkane foaming agent to prepare the polyurethane foam in place while at the same time employing a deep drawn styrene plastic liner.

Description of drawings

An illustrative embodiment of the present invention is shown in the accompanying drawing, in which—

FIGURE 1 is an end view of a picnic cooler chest with the lower portion broken away and shown in section;

FIG. 2 is a side view of the same cooler chest, the lower portion being broken away and shown in section; and FIG. 3 is an enlarged fragmentary view of the right hand corner portion of the chest as shown in FIG. 2.

Detailed description

Looking first at FIGS. 1 and 2, the picnic cooler chest is designated generally by the number 10. The chest has the general configuration of the conventional top opening type, being equipped with a lid 11 which is hingedly connected at one side to the outer casing 12, as indicated at 13. The other side of lid 11 is provided with a suitable releasable catch assembly designated generally by 14.

Outer casing 12 may be formed in two pieces, the lower portion 12a being united to the upper portion by a suitable joint 15. This construction permits the casing bottom portion 12a to be formed from plastic while the upper portion of casing 12 is formed from metal. The lower end of the metal portion may be crimped about to the upper end of the plastic to form the joint 15. These are all conventional features and are not part of the present invention. It will be understood that the cooler may be provided with other conventional elements, such as the handle assembly 16 which are mounted on the opposite ends of the chest, as indicated in FIG. 1.

The chest also includes a liner 17 having four upwardly-extending sides and a generally horizontal bottom 18. Liner 18 may be formed of plastic, such as a thermoplastic, by drawing process. Typically, liner 17 may be described as a deep drawn plastic liner, although the liners may be formed from plastic by other processes.

In the space between liner 18 and casing 12, there is provided a suitable insulating material 19. As shown, the insulating material 19 extends around the sides and bottom of the liner in supporting relation therewith.

In accordance with the present invention, insulating material 19 is a rigid polyurethane foam. The polyurethanes are also referred to as isocyanate resins. Rigid polyurethane foams may be prepared by well known procedures from polyesters, diisocyanates, and water. For the purpose of the present invention, the polyurethane foam is prepared in place using a suitable foaming agent. The preferred foaming agent is a chlorofluoroalkane such as dichlorodifluoromethane or trichlorofluoromethane.

The plastic liner 18 is preferably formed of a styrene plastic such as polystyrene or styrene copolymers. As is well known in the art, styrene may be copolymerized with acrylonitrile, butadiene, and other resin monomers having a reactive vinyl group. One particularly preferred plastic is known as "ABS," which designates a copolymer of styrene with acrylonitrile and butadiene.

It has been found that the objects of the present invention can be substantially accomplished by incorporating a sheet of flexible fiberboard 20 between the bottom 18 of the liner and the polyurethane foam 19. The fiberboard sheet 20 is interposed and positioned so that it has its upper surface in contact with the underside of the liner bottom 18 and its lower surface in contact with the polyurethane foam 19. The sheet 20 may be formed of ordinary paper board such as cardboard or fiberboard. It has been found desirable to use fiberboard for sheet 18 which is not only flexible but also compressible. In FIGURE 3, there is shown the sheet member designated generally by the number 20 which comprises corrugated paper board formed of the top paper layer 20a, a bottom paper layer 20b, and a corrugated inner paper layer 20c. It will be understood that the layers 20a, 20b, and 20c are adhesively united to form the sheet of corrugated fiberboard.

Prior to the insertion of liner 17 and the foaming of the insulation 19, the sheet 20 can be placed against the liner bottom 18. Preferably, sheet 20 is dimensioned to substantially cover the entire bottom, although it does not need to extend to the corners between the side and the bottom. The sheet 20 may be temporarily held in place by means of pressure-sensitive adhesive tape strips, such as the strip 21 shown in FIG. 3. After the foaming of the polyurethane, the rigidified foam will hold the sheet 20 firmly against the bottom 18.

For the construction of the present invention, the liner bottom 18 is effectively protected against puncturing. Although the fiberboard sheet 20 is porous, it nevertheless sufficiently protects the liner 18 against mechanical or chemical degradation by the polyurethane foam and the chlorofluoroalkane foaming agent. Moreover, the sheet 20, although flexible and compressible, provides an effective auxiliary support for the liner bottom 18. The liner bottom is permitted to yield under impact while at the same time the impact load is spread over a wider area of the urethane foam. Apparently this protects the urethane foam against shear forces, which would cause it to break or shear rather than bend or depress due to the inherent friability of the polyurethane.

While the sheet material 20 preferably has the construction described above, some of the advantage of the present invention can be achieved by utilizing other flexible, compressible sheet materials to form the sheet 20. For example, some success has been achieved by utilizing thin metal foil, such as tin-plated steel foil, aluminum foil, etc.

In a specific embodiment, the liner 17 is formed from an "ABS" plastic containing approximately 22% acrylonitrile, 17% butadiene, and 61% styrene. The urethane foam is produced from the reaction product of a polyisocyanate and a polyhydroxyl material in the presence of catalysts, surface active agents, and blowing or foaming agents. For example, Vultafoam 15-FR-1602, General Latex & Chemical Corporation, can be used. This product is a two part formulation, the first part containing from 30 to 50% of polyether polyol, 1 to 5% of catalyst, silicone cell control agent, and a trace of water, and 10 to 20% of the blowing agent. The other part consists of 30 to 50% quasiprepolymer, which is an adduct of a polyisocyanate and polyether polyol. The blowing agent can be trichlorofluoromethane or dichlorodifluoromethane, but is preferably trichlorofluoromethane. It will be understood that the formulation is foamed in place to produce a rigid polyurethane foam 19. The sheet 20 is formed of a corrugated fiberboard. For example, the sheet 20 can be double faced corrugated fiberboard, 200 lb. test, "B" flute. The liner is formed by deep drawing the "ABS" sheet plastic having an initial thickness of about .12 inch. On completion of the draw the bottom of the liner will have an average thickness of about .0355 inch.

While in the foregoing specification this invention has been described in relation to a preferred embodiment thereof and many details have been set forth for purpose of illustration, it will be apparent to those skilled in the art that the invention is susceptible to other embodiments, and that certain of the details described herein can be varied without departing from the basic principles of the invention.

I claim:

1. In a top opening picnic cooler chest having a plastic liner, an outer casing enclosing said liner in spaced relation thereto, and an insulating material in the space between said liner and said casing, the combination wherein:
    said liner is formed of a styrene plastic selected from polystyrene and styrene copolymers,
    said insulating material is a rigid polyurethane foam extending around the sides and bottom of said liner in supporting relation therewith,
    and a sheet of flexible fiberboard is interposed between the bottom of said liner and said polyurethane foam,
    said fiberboard sheet having its upper surface in contact with the underside of said liner bottom and its lower surface in contact with said polyurethane foam.

2. The combination of claim 1 wherein said fiberboard sheet is corrugated fiberboard.

3. The combination of claim 1 wherein said plastic liner is formed from a polymer of styrene, butadiene, and acrylonitrile.

4. The combination of claim 1 wherein said rigid polyurethane foam was prepared in place using a chlorofluoroalkane foaming agent.

5. In a top opening picnic cooler chest having a deep drawn plastic liner, an outer casing enclosing said liner in spaced relation thereto, and an insulating material in the space between said liner and said casing, the combination wherein:
    said liner is formed of a styrene plastic selected from polystyrene and styrene copolymers,
    said insulating material is a rigid polyurethane foam extending around the sides and bottom of said liner in supporting relation therewith, said polyurethane foam having been prepared in place using a chlorofluoroalkane foaming agent, and a sheet of flexible, compressible fiberboard is interposed between the bottom of said liner and said polyurethane foam,
    said fiberboard sheet having its upper surface in contact with the underside of said liner bottom and its lower surface in contact with said polyurethane foam.

6. The combination of claim 5 wherein said fiberboard sheet is corrugated fiberboard.

7. The combination of claim 5 wherein said plastic liner is formed from a polymer of styrene, butadiene, and acrylonitrile.

References Cited

UNITED STATES PATENTS

| | | | |
|---|---|---|---|
| 2,552,641 | 5/1951 | Morrison | 220—9 |
| 2,948,430 | 8/1960 | Teague et al. | 220—9 |
| 2,954,891 | 10/1960 | Imber | 220—9 |
| 3,003,810 | 10/1961 | Kloote et al. | 220—9 |

FOREIGN PATENTS

| | | |
|---|---|---|
| 986,769 | 3/1965 | Great Britain. |

THERON E. CONDON, *Primary Examiner.*

JAMES R. GARRETT, *Examiner.*